July 4, 1961 W. W. GREGG 2,991,133
ANTI-FRICTION BEARING CONSTRUCTION
Filed March 22, 1960
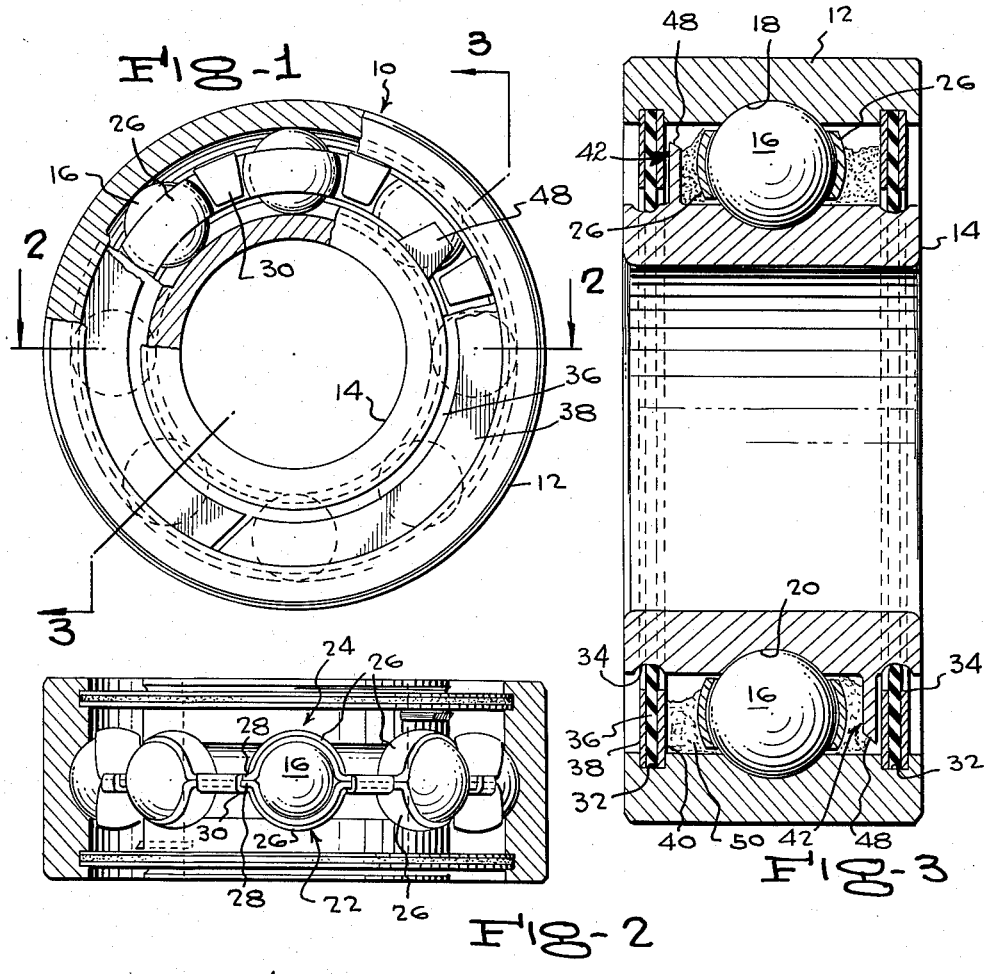
INVENTOR.
WOODROW W. GREGG
BY
McMorrow, Berman & Davidson
ATTORNEYS

20

United States Patent Office 2,991,133
Patented July 4, 1961

2,991,133
ANTI-FRICTION BEARING CONSTRUCTION
Woodrow W. Gregg, 522 Fairwell St., Hamilton Acres, Fairbanks, Alaska
Filed Mar. 22, 1960, Ser. No. 16,888
3 Claims. (Cl. 308—187.2)

This invention relates to bearings and, more specifically, the present invention pertains to ball or roller type anti-friction bearings which necessarily require lubrication.

It is a well known fact that rotors of modern apparatus, depending upon the work the same is to perform, are designed for rotation at relatively high or low speeds. Additionally, such rotors find application in apparatus to be operated in and under conditions of relatively high or very low heat. All such rotors must be supported in suitable bearings and it is not infrequent that such bearings are so located that after having been originally installed and lubricated, the bearings cannot be re-lubricated. Thus, if the grease or other lubricant escapes or accumulates at points within the bearing wherein the grease or other lubricant can no longer serve its function, the bearings will heat up and fail.

Therefore, one of the primary objects of this invention is to provide in an anti-friction bearing, means for continuously forcing grease or other lubricant of a sealed bearing towards the bearings, per se.

Another object of this invention is to provide, in a sealed ball bearing, means for continuously scraping the inner surfaces of the seals whereby grease or other lubricant adhering thereto is continually forced inwardly and towards the bearings.

A further object of this invention is to provide a sealed anti-friction bearing with means for causing its lubricating medium to flow in a predetermined path within the bearing thereby giving rise to a more efficient lubrication of the bearing and prolonging the life thereof.

Another object of this invention is to provide in a sealed rotor bearing, spaced means for forcing the bearing lubricant inwardly and towards the roller bearings to insure full lubrication thereof.

This invention contemplates, as a still further object thereof, the provision of a sealed anti-friction bearing of the type generally described supra, wherein the bearing is non-complex in construction and assembly, inexpensive to manufacture, and wherein the life of the bearing is prolonged.

Oher and further objects and advantages of the instant invention will become more evident from a consideration of the following specification when read in conjunction with the annexed drawing, in which:

FIGURE 1 is a side elevational view partially broken away to illustrate the novel lubricating scraper means for a sealed anti-friction bearing constructed in accordance with this invention;

FIGURE 2 is a detail cross-sectional view of the bearing shown in FIGURE 1, FIGURE 2 being taken substantially on the horizontal plane of line 2—2 of FIGURE 1, looking in the direction of the arrows;

FIGURE 3 is an enlarged detail cross-sectional view taken substantially on the inclined plane of line 3—3 of FIGURE 1, looking in the direction of the arrows; and, FIGURE 4 is a perspective view of the inner bearing race of the bearing illustrated in FIGURE 1.

Referring now more specifically to the figures of the drawing, reference numeral 10 designates, in general, a conventional sealed ball bearing which includes an annular outer bearing race 12 and a concentrically spaced annular inner bearing race 14. Intermediate the remotely disposed ends of the two races 12, 14 are disposed a plurality of ball bearings 16 held captive in a pair of oppositely disposed, spaced and confronting, circumferential grooves 18, 20 formed in the outer and inner races 12, 14, respectively.

The ball bearings 16 are held in circumferentially spaced relation by means of a pair of diametrically opposed annular retainer rings 22, 24, each having a plurality of circumferentially spaced concavo-convex portions 26, and each adjacent pair thereof are connected together by means of straps 28. The retainer rings are positioned in such a manner that the concave portions thereof face each other to cup ball bearings 16 therebetween, and with their respective straps 28 superimposed against one another. The strap 28 of the retainer ring 24 is locked to the strap 28 of the retainer ring 22 by means of a flange 30 which extends from the strap 28 of the ring 24 and is reverted about the strap 28 of the ring 22.

The outer race 12, adjacent each end thereof is provided with a substantially U-shaped continuous recess 32 (see FIGURES 2 and 3) which extends inwardly from the inner side thereof. The recesses 32 confront arcuate recesses 34 formed in the outer side of the inner race 14 adjacent each end thereof.

Reference numeral 36 denotes a sealing ring which may be formed of rubber or of any desirable and suitable plastic material. As is seen in FIGURES 2 and 3, the sealing ring 36 is seated within the circumferential grooves or recesses 32, 34, and engaged within each of the recesses 32 and disposed on opposite sides of the sealing ring 36 is a pair of metallic reinforcing rings 38, 40.

Reference numeral 42 denotes a pair of lubricant scraper plates fixedly secured to the inner bearing race 14, the blades 42 being disposed 180 degrees apart and being axially spaced from one another to locate the same in positions very close to but slightly spaced from the adjacent faces of the reinforcing rings 40.

Each of the scraper plates 42 is trapezoidal in configuration and is constructed with a pair of opposed bevelled cutting edges 44, 46 at opposed sides thereof and a bevelled cutting edge 48 at its outer or free end. The cutting edges 44, 46, 48 are inclined inwardly, as is seen in FIGURE 3 of the drawing, towards the inner race 14.

A suitable lubricant for the bearing 10 is provided and generally comprises grease or other similar lubricants designated in general by reference numeral 50.

The operation of the bearing pin is deemed to be now self-evident from the foregoing specification and through reference to the drawing. However, a brief explanation of its operation is offered below.

Let it be assumed that the inner race 14 of the bearing 10 receives therein and is connected to a rotating shaft (not shown). As the inner race 14 rotates, the ball bearings 16 tend to rotate about the axis of the bearing 10 in the same direction but at a lesser speed. The ball bearings 16 normally spin within the opposed annular retainer rings 22, 24, and in so moving, grease or other lubricant 50 is normally expressed outwardly on diametrically opposed sides of the ball bearings 16 in a direction toward the sealing ring 32 and its reinforcing rings 38, 40. If no means were provided for removing the expressed lubricant, the lubricant would adhere and cake against the aforementioned rings, and when this condition occurs, the bearing is running dry and will heat up due to the increased friction between the rotating component elements of the bearing 10. This is most undesirable and tends to diminish the life of the bearing and makes necessary frequent replacements which would not occur if the bearing were maintained in a satisfactory lubricated condition. Proper lubrication is assured through the practice of the teachings of this invention inasmuch as extruded grease thrown against the rings 40 is scraped therefrom by the bevelled cutting edge 44 or 46 of the leading sides of the scrapers 42 depending upon the direction of rotation of the inner race 14. The inclined angle of the cutting edges 44, 46 and also of the cutting edge 48 are disposed in planes so related to the race 14 as to cause or force the grease to pass across the adjacent faces 54 of the scrapers 42 for return of the grease in a direction towards the bearings 16. Thus, constant lubrication of the ball bearings 16 is assured, and the objects of the invention as set forth above are achieved.

Having described and illustrated one embodiment of this invention, it is to be understood that the same is offered merely by way of example, and that this invention is to be limited only by the scope of the appended claims.

What is claimed is:

1. Means for continuously lubricating a sealed ball bearing having an outer and inner bearing race, ball bearings interposed between said races, and sealing ring means at each of the adjacent ends of said races and extending therebetween; said first means comprising a blade fixedly secured to said inner race adjacent each of its respective ends, each of said blades having a free end, and each of said blades projecting radially from said inner race proximate to but spaced from an adjacent one of said sealing ring means.

2. Means for continuously lubricating a sealed ball bearing having an outer and inner bearing race, ball bearings interposed between said races, and sealing ring means at each of the adjacent ends of said races and extending therebetween; said first means comprising a scraper blade fixedly secured to said inner race adjacent each of its respective ends, said blades being circumferentially spaced 180 degrees apart, said scraper blades each having a free end, and said scraper blades being disposed immediately adjacent said sealing ring means for scraping away lubricant adhering thereto.

3. Means for continuously lubricating a sealed ball bearing having an outer and inner bearing race, ball bearings interposed between said races, and sealing means at each of the adjacent ends of said races and extending therebetween; said first means comprising a scraper blade fixedly secured to said inner race adjacent each of its respective ends, said blades being circumferentially spaced 180 degrees apart, said scraper blades each having a free end edge and a pair of opposed side edges, said edges each having a bevelled face inwardly inclined towards said inner race, and said blades being disposed in close proximity to but spaced from said sealing means to scrape said lubricant therefrom, said scraped lubricant being forced by said scrapers towards said ball bearings to effect a continuous lubrication thereof.

References Cited in the file of this patent

UNITED STATES PATENTS 2,143,091     Searles _____ Jan. 10, 1939